United States Patent Office 3,226,340
Patented Dec. 28, 1965

3,226,340
CATALYST COMPOSITIONS COMPRISING ALUMINA WITH AN INNER LAMINA OF METAL OXIDE AND AN OUTERMOST LAMINA OF COPPER OXIDE
Ruth E. Stephens, Detroit, Daniel A. Hirschler, Jr., Birmingham, and Frances W. Lamb, Detroit, Mich., assignors to Ethyl Corporation, New York, N.Y., a corporation of Virginia
No Drawing. Filed Mar. 30, 1961, Ser. No. 99,381
6 Claims. (Cl. 252—465)

This invention relates to novel catalysts and a method for their preparation. The invention also relates to a novel method for the oxidation of hydrocarbons and carbon monoxide which are present in the exhaust gas of internal combustion engines.

In our earlier filed copending application, Serial No. 26,699, filed May 4, 1960, now abandoned, we have described and claimed compositions especially effective as catalysts for the oxidation of hydrocarbons and carbon monoxide found in the exhaust gas of internal combustion engines. These compositions comprise mixtures of copper oxide, certain transitional aluminas, and, optionally, a metal or metal oxide. Such catalysts have high oxidation efficiencies and are extremely resistant to the poisoning effects of exhaust gas constituents, especially the decomposition products of sulfur compounds and tetraethyllead. The properties of copper catalysts in this regard are superior by far to those of most other metals, and inherently such catalysts are eminently suited for an exhaust gas application.

However, under certain conditions these copper catalysts may be subject to softening which, in turn, results in crumbling and pulverization. The fines resulting from this attrition may then be discharged with the exhaust gas stream leaving voids or channels through which the exhaust gas may be short-circuited through the catalyst bed. This deterioration apparently results from a combination of the physical shocks and continual vibration to which the catalyst is subjected and perhaps to a greater degree due to chemical reaction between the alumina carrier and the copper oxide impregnated thereon. Apparently, the copper oxide and alumina unite to form a copper-aluminate which has physical properties inferior to those of the catalyst prior to extended field use. Because of this, on prolonged severe service, the effectiveness of the catalyst may fall off to some extent.

The present invention represents an improvement over those catalysts whereby the effectiveness as influenced by changes in the physical condition of the catalyst remains substantially unchanged after prolonged severe service.

An object of this invention is to provide unique catalyst carriers and also supported catalysts, which are particularly resistant to softening, attrition, fracturing and pulverization, etc. A further object is to provide a method for the preparation of these catalysts. Still another object is to provide a method of oxidizing substantial amounts of the unburned hydrocarbons and carbon monoxide found in the exhaust gas of internal combustion engines.

According to the present invention, we provide novel catalysts comprising a major portion of transitional alumina having an initial lamina deposited thereon of oxides of one or more metals selected from the group consisting of The First Transition Series of the Periodic Table and the Lanthanide Series of Elements, followed by an outermost lamina of copper in an oxide form. The finished catalyst contains a major portion of transitional alumina, from 0.5 to 20 percent of said metal and from about 0.5 to 25 percent of copper, all in oxide forms. The metals of the First Transition Series of the Periodic Table include scandium, titanium, vanadium, chromium, manganese, iron, cobalt, and nickel; see page 870 of "Inorganic Chemistry" by Therald Moeller, John Wiley and Sons, Inc., New York, New York (1952). The elements included in the Lanthanide Series are yttrium, lanthanum, cerium, praseodymium, neodymium, promethium, samarium, europium, gadolinium, terbium, dysprosium, holmium, erbium, thulium, ytterbium, and lutetium; see Moeller supra, pages 891–893. These elements are also commonly known as rare earth metals.

The carrier materials of our invention are transitional aluminas having a surface area of at least 75 m.$^2$/g. and a silica content of from 0.01 to about 5 percent. These carrier materials are more fully described below.

The term initial lamina is used throughout to denote one or more layers of a metal oxide or of a layer of oxides of different metals deposited between the alumina carrier and the outermost lamina of copper oxide. The initial lamina may comprise one layer of one metal oxide or successive layers of the same metal oxide, or successive layers of oxides of different metals, or one layer of a mixture of oxides of different metals, or successive layers of a mixture of oxides of different metals, or any combination of the foregoing. It will be understood that the term metal oxide may include different oxide forms of the same metal and, indeed, in many cases various oxides of the metal are present. A critical feature of our catalysts is that there must be at least one layer of at least one of the metal oxides previously enumerated between the alumina carrier and the outermost layer, which must always be copper in an oxide form.

The choice of the metal(s) deposited on the alumina carrier as the initial lamina (henceforth also referred to as precoating metal) is based on two considerations: (1) the ability of the precoating metal to give the finished catalyst superior physical properties and (2) the resulting oxidation efficiency of the finished catalyst. We have found that while some metals used as precoating metals are extremely beneficial with respect to improving physical properties, the finished catalysts may have somewhat inferior properties with respect to oxidation of hydrocarbons and carbon monoxide. Conversely, the use of other metals results in a catalyst having superior oxidation properties but with relatively poor physical characteristics. Considering these factors, the use of oxides of chromium, manganese, iron, cobalt, nickel and oxides of one or more elements of the Lanthanide Series of Elements (rare earth oxides) is preferred. More particularly, using iron, manganese, or a mixture of rare earth oxides as precoating materials provides catalysts with excellent properties with respect to both oxidation efficiencies and resistance to softening and attrition. The catalyst may have consecutive layers of the individual metal oxides, or oxides of various metals may be mixed and applied as a single layer prior to the outer copper oxide layer. Accordingly, a transitional alumina coated with from about 0.5 to about 20 percent of iron oxide or manganese oxide or a mixture of rare earth oxides, or a combination of these various oxides, and then impregnated with from about 0.5 to 25 percent by weight of copper in oxide form constitutes a preferred embodiment of this invention.

Precoating the carrier material with one or more metal oxides and thereby forming a thin layer previous to the impregnation with copper oxide, is a critical feature of the catalysts of this invention. In other words, the finished catalyst must have at least two successive layers of metal oxides and the outermost layer must be of copper oxide. This is in contrast to catalysts wherein the metal oxides including copper oxide are simultaneously deposited on the carrier from a common solution. This precoating adds physical strength to the catalyst and perhaps, more importantly, serves to prevent chemical reaction between copper and the active alumina carrier. Whether the precoating material acts as an insulator between the alumina and the copper, or if it itself replaces copper or alumina as a reactant is not clearly understood. Suffice it to say that the catalysts of this invention have vastly superior physical properties as compared to catalysts which have not been precoated.

As stated above, depositing an initial lamina imparts superior physical properties to the alumina carrier. The use of oxides of manganese or iron or a metal of the Lanthanide Series or of a combination of these oxides is especially preferred. Thus, another aspect of our invention is a catalyst carrier, having superior physical properties, comprising transitional alumina coated with at least one lamina of an oxide of at least one metal selected from the group consisting of the metals of atomic numbers 25 and 26 and the Lanthanide Series of Elements.

Particular attention is called to the alumina used as the carrier material in the catalysts of this invention. The specific type of alumina is critical. The alumina referred to is activated alumina to be contrasted with ordinary aluminum oxides which cannot be used in the catalysts of this invention. The activated alumina is an active desiccant, has active adsorbing characteristics and has the ability to catalyze certain hydrogenation and dehydrogenation reactions; whereas, ordinary aluminum oxides such as those prepared from aluminum hydroxide are essentially void of these properties. Likewise, the use of materials such as porcelain chips, silica gel, pumice, and quartz and the like result in vastly inferior catalysts and cannot be used as the carrier material for the catalysts of this invention.

Generally, the carrier material serves as a support of a binder for the active catalytic agent, but in itself has little, if any, catalytic activity for the reaction in question. Other mechanical functions might be to impart physical strength and to serve as an aid in the dissipation of heat to prevent sintering. For such purposes, any one of the well-known carrier materials may be equally effective. Aside from purely mechanical functions, a carrier material may serve to give a larger exposure of the catalytic agent, increase thermal stability, modify catalytic selectivity and provide increased resistance to poisoning of the active agent. Also a complex formation may take place between the carrier and the active agent which results in an overall material having better catalytic properties per unit area than the active agent alone. It is because of these non-purely mechanical functions that a carrier material may be specific for a given catalytic agent with respect to a particular reaction; that is, although a catalytic agent on one carrier material may be an excellent catalyst for a specific reaction, it may behave entirely differently and be a poor catalyst if supported by a different carrier material.

We have found that a particular type of activated alumina, to be described below, precoated with one or more of the enumerated metals, then impregnated with copper oxide, has all the requisites for an exhaust gas application. However, laminated copper catalysts wherein other well-known carrier materials are used and indeed, even other grades of aluminas, result in inferior catalysts for this purpose. In other words, a particular grade of activated alumina carrier is specific for the active agents, and the reaction in question.

One of the most striking and unusual features of our catalysts is the critical nature of the alumina which is employed as a carrier or base. The broad spectrum of aluminas, in general, cannot be used indiscriminately. Only certain highly select and specific types of alumina are useful. The aluminas which are used as carriers in our invention can be described as "transitional" aluminas. They are metastable forms which, in general, are produced by heating of alpha or beta alumina trihydrates or of alpha alumina monohydrate. As each of these starting materials, or any mixture thereof, is heated, phase changes take place. A number of intermediate or transitional alumina phases are formed. These are characterized by being only partially or poorly crystalline. They are partly amorphous and partly crystalline. Formation of these phases is reversible; i.e., on rehydration, they can be converted back to the starting materials. On prolonged heating, particularly at very high temperatures such as 1150° C., they are converted into the so-called "alpha alumina" which is a stable, refractory type of alumina not applicable to this invention. Conversion of the transitional forms of alumina to the alpha form is irreversible and any substantial conversion to this form is to be avoided in the preparation of alumina carriers of this invention.

In the overall transition between the alumina trihydrates and alpha alumina, several different transitional aluminas are prepared, either simultaneously or concurrently. Some of these transitional phases are convertible to others upon appropriate heating or cooling. It is immaterial in the practice of our invention which particular transitional alumina is used so long as the carrier predominantly consists of at least one transitional form and so long as the content of alpha alumina in the catalyst is kept at a minimum.

According to the nomenclature used in the pamphlet, "Alumina Properties," Russell et al., published by the Aluminum Company of America, Pittsburgh, Pennsylvania, 1956; the names assigned to the various transitional aluminas are gamma, delta, eta, theta, kappa, chi and rho. All these are useful as carriers in our invention. In addition, the alpha monohydrate itself is in a sense a transitional alumina, since it is a product reversibly obtained on heating of either alpha or beta alumina trihydrate under suitable conditions of temperature and time. The alpha monohydrate is useful as an alumina carrier of this invention. In addition to the transitional forms described above, there is a truly amorphous alumina which is characterized by having no definite X-ray diffraction pattern. This amorphous material is usually present along with the transitional aluminas of this invention and for purposes of this invention is included among them.

Any of the transitional aluminas mentioned above can be used singly as a carrier of this invention. We ordinarily prefer, however, to use mixtures of two or more of the transitional aluminas including mixtures of as many as nine. Indeed, in any practicable method of preparation, a mixture of at least two, and usually more than two, is perforce formed.

It appears not possible to describe each transitional alumina in terms of its specific physical properties, other than those mentioned above. Many can be characterized by their X-ray diffraction pattern. Several of these are reproduced on page 28 of the pamphlet referred to above.

It is likewise not possible to ascribe definite procedures to preparation of the transitional aluminas of this intacted with our novel catalysts. By the use of this method substantially all of the carbon monoxide is converted to carbon dioxide and a great percentage of the unburned hydrocarbons are completely oxidized to carbon dioxide and water. Further, the catalysts of this invention, in addition to having superior physical properties, are active over a wide temperature range and under a variety of engine operating conditions. Other important aspects of our catalysts are excellent thermal stability at extremely high temperatures and their non-catalytic effect toward the oxidation of nitrogen.

One of the outstanding features of our catalysts is their resistance to many potential catalyst poisons found in exhaust gas streams. Our catalysts are extremely resistant to the poisoning effects of the combustion products of sulfur and of organolead antiknock agents present in virtually all commerical gasolines. The oxidation products of sulfur and of organolead compounds such as tetraethyllead are well-known catalyst poisons. Many catalysts otherwise suited as catalysts are adversely affected by these oxidation products and, with use, lose activity and are eventually rendered inactive. As will be subsequently shown, catalysts of this invention are extremely resistant to these poisons and activity is retained over extremely long periods of time.

Another outstanding feature of our catalysts is their physical ruggedness and durability. Catalysts for an exhaust gas application are subjected to extremes in temperature ranging from below freezing to as high as 1800 or 1900° F. Moreover, by the very nature of the application; that is, in an automobile, they are subjected to continual agitation, vibrations, and physical shock. These combined effects plus possible chemical reactions between the catalyst carrier, the active metal constituents, and/or the exhaust gas products impose a severe criteria of high catalyst ruggedness and durability.

The catalysts of this invention may be prepared in a variety of ways. They may be prepared by contacting the activated transitional alumina with a solution, not necessarily aqueous, of an organic or inorganic compound of the precoating metal, allowing sufficient time for impregnation, followed by appropriate treatment to convert the metal compound to the oxide form. When using a plurality of metals as precoating materials, the above procedure may be repeated, thus forming successive laminae of metal oxides. Alternatively, a common solution comprising a mixture of the precoating metals may be used to deposit only one layer. In either event, the metal compound(s) impregnated on the carrier must, by appropriate treatment, be converted to the oxide form prior to the impregnation with a copper compound. The alumina carrier thus coated with at least one lamina of a metal oxide is then impregnated with a solution of a copper compound. Again by appropriate treatment, the copper compound is converted to the oxide form. The appropriate treatment referred to in converting a metallic compound to an oxide form may be accomplished by any of the methods known to those skilled in the art. For example, an oxidizing agent may be included in the solution. However, a more appropriate and convenient form is simply to heat the mass in the presence of air or oxygen.

The impregnation of the precoating metal(s) may be accomplished from solutions of nitrates, carbonates, sulfates, hydroxides, lactates, formates, acetates, oxalates, propionates, benzoates and the like of the precoating metal. Further organic compounds of the appropriate metals from which our catalysts can be prepared include compounds such as cyclopentadienyl derivatives, the carbonyl derivatives, etc. Examples are cyclopentadienyl manganese tricarbonyl, dimanganese decacarbonyl, cylcopentadienyl manganese benzene, iron carbonyl, etc. If it is desired to use a plurality of precoating metals, common solutions judiciously selected may be used for this purpose. The same general types of compounds are useful for impregnating the coated carrier with copper. In addition, organo-copper compounds such as cyclopentadienyl copper triethylphosphine, bis ethylamino methylene acetone copper II, and the like can be used. In addition to the catalytic agents in our catalyst, other materials with a non-catalytic function may be included. The use of materials to serve as binders, lubricants, etc. is well known to those skilled in the art.

A preferred method of making our catalysts consists of starting with a nitrate solution of the preferred precoating metals; that is, chromium nitrate, manganese nitrate, iron nitrate, cobalt nitrate, or nickel nitrate. The transitional alumina is then thoroughly impregnated with the solution. The solution is then heated to dryness, or alternately, decanted. The mass is then heated in the presence of air or oxygen thereby converting the metal to an oxide form. When using a plurality of metals, this procedure may be repeated with each metal or the carrier may be impregnated with a common solution of the nitrates of the metals. When using a plurality of metals, we prefer the latter technique. Our preferred method of then impregnating the coated carrier with copper oxide embodies starting with a copper salt or an oxide and forming an ammoniacal solution whereby a deeply violet-colored copper ammonia complex is formed. The coated alumina is then impregnated with the copper complex and gradually heated. During the heating process, the copper complex is decomposed to yield the active copper oxide form.

Our preferred starting material for the copper impregnation step is basic copper carbonate, usually either the malachite or azurite forms, or a mixture of both. When this material is mixed with a solution of ammonium carbonate and ammonia, a violet-colored copper ammonium carbonate complex is formed. The coated alumina can then be impregnated with the copper complex which is then easily decomposed to copper oxide by heating.

We have found that catalysts prepared in this manner are superior to those made by other methods. Such catalysts have the advantages of being more resistant to softening and attrition and of having better stability and longer life. This preferred method, besides producing superior catalysts, has the advantages of starting with relatively inexpensive materials, being able to produce a highly concentrated solution of the metals, and the ease of decomposing to the active oxide form.

The following examples are not meant to limit the methods of making our catalysts but to show some of our preferred methods.

*Example I*

F–1 grade alumina is used as the carrier in this example. This transitional alumina has about 92 percent $Al_2O_3$, about 0.8 percent $Na_2O$, about 0.12 percent $Fe_2O_3$, and about 0.09 percent $SiO_2$. On ignition it loses about 6.0 percent of its weight. It is a granular material having a surface/mass ratio of about 210 m.$^2$/g. Its bulk density (packed) is about 55 lb./ft.$^3$, and its specific gravity is about 3.3. It is prepared by calcination of alpha alumina trihydrate and contains a mixture of the transitional aluminas described earlier in this specification.

The alumina carrier is immersed in a 50 percent solution of manganese nitrate and allowed to stand so as to be thoroughly impregnated. The solution is then heated to dryness. The mass is then spread on a surface which is heated to above the decomposition temperature of manganese nitrate. A draft of air or oxygen-containing gas is passed over the material. During the heating, the manganese nitrate decomposes to an oxide or mixture of oxides, both $Mn_2O_3$ and $Mn_3O_4$ probably being present. The cooled material, F–1 alumina, coated with oxides of manganese, is now ready for the copper impregnating step.

A solution is prepared comprising 5 parts of ammonium carbonate, 18 parts of aqueous ammonium hydroxide (28 percent $NH_3$), and 11 parts of malachite,

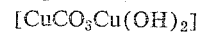

At this point a deeply violet-colored solution is formed. The copper is in solution as the complex tetramminecopvention. Conversion of the starting materials—alpha and beta alumina trihydrates and alpha alumina monohydrate—to one or more of the transitional aluminas of this invention, as well as conversion of one transitional alumina to another is a function of both time and temperature. Heating to a high temperature for a short time can result in a mixture of transitional aluminas having the same composition as is produced by heating the same starting mixture or ingredient to a lesser temperature for a longer time. Generally speaking, alpha alumina trihydrate is converted to the alpha monohydrate at about 140° C. in air or superheated steam and at about 100° C. in vacuum. Beta alumina trihydrate appears to be readily converted to the alpha monohydrate at about 120–160° C. Heating of the alpha trihydrate to about 140° C. for one hour results in some conversion to the chi transitional form. The chi form, in turn, goes over to some extent to the kappa transitional alumina when heated to 500° C. for one hour. Heating of the alpha monohydrate for one hour at 250° C. gives some gamma, which on heating at 850° C. for the same length of time produces some theta transitional alumina, with possible intermediate conversion to delta. Heating of the beta trihydrate to 140° C., in addition to producing some alpha monohydrate, also produces some of the eta activated form. This in turn goes over to theta on heating at 450° C.

The kappa and theta forms are converted to the alpha alumina, not useful in this invention, on heating to 1150° C. for one hour.

In general then, the transitional aluminas used in this invention are prepared by heating a starting alumina selected from the class consisting of alpha alumina trihydrate, beta alumina trihydrate and alpha alumina monohydrate to a temperature of at least 100–150° C. for a period of time sufficinet to permit substantial conversion to a transitional alumina but insufficient to convert a substantial fraction of the transitional aluminnas irreversibly to the inactive alpha alumina. In general, prolonged heating above about 1000° C. should be avoided. Our carriers in some cases may contain small amounts of either the starting material or alpha aluminas, or both.

In addition to the inherent transitional nature of the alumina itself, certain other properties are essential for use as carriers of this invention. The most important of these appears to be the surface area/mass ratio and the content of silica, $SiO_2$. The transitional aluminas which we use are those whose surface area/mass ratio is at least 75 square meters per gram (m.$^2$/g.) and those having a silica content of from 0.01 to 5 percent. In order to function efficiently according to our invention, the transitional alumina must meet both these criteria. If the surface is greater than the above minimum but the silica content greater than the above maximum, the alumina does not function well. By the same token, if the silica content is 5 percent or below but the surface area is below 75 m.$^2$/g., the alumina does not function as a carrier of this invention. Nor does it so function if neither the silica content nor the surface area is within the above specifications.

In illustration of the importance of the above properties, we have tested aluminas with surface areas as high as 350 m.$^2$/g. but with a silica content greater than 5 percent. These have resulted in catalysts with inferior properties with respect to exhaust gas conversion. Also, an alumina with a silica content less than 5 percent but with a surface area of only 0.5 m.$^2$/g. was ineffective as a support.

Certain aluminas meeting the requisites of this invention are commercially available. Included in these are those sold by Aluminum Company of America as "Desiccant Grade Active Aluminas; Grades F–1, F–3, and F–10" and by the Kaiser Aluminum Company as "KA– 101." Analyses and physical properties of typical aluminas of this invention are:

CHEMICAL ANALYSIS

| | Percent |
|---|---|
| $Al_2O_3$ | 85.0–95.4 |
| $Na_2O$ | 0.4–2.0 |
| $Fe_2O_3$ | 0.02–0.15 |
| $SiO_2$ | 0.02–5. |
| Loss on Ignition, 1100° C. | 4.2–8.5 |

PHYSICAL PROPERTIES

| | Percent |
|---|---|
| Surface area, m.$^2$/g. | 75–360 |
| Form | (1) |
| Bulk density lb./ft.$^3$ | 43–57 |
| Specific gravity | 3.1–3.3 |
| Pore volume ml./g. | 0.25–0.3 |
| Pore diamter, A | 40–50 |
| Dynamic sorption percent | 11–23 |
| Crushing strength percent | 55–66 |

[1] Granular or balls.

One method of large-scale preparation of the alumina carriers of this invention is as a by-product of the Fickes-Sherwin modification of the Bayer process in the manufacture of metallic aluminum. During the process, aluminum trihydrate is precipitated from alkali aluminate solutions. This material, a scale-like deposit, is then crushed or ground and calcined at a temperature between 300 and 800° C. The finished material is used primarily as a commercial absorbent. It does not readily pack, can be used in high pressure application, and after use, can be readily regenerated.

The granular aluminas we use as the carrier material for our catalysts may be from about 2.5 to 8 mesh (Tyler Standard Screen Scale Sieves). However, we have found materials of from 3 to 6 mesh to be optimum for this exhaust gas application. We have found that under certain conditions the ball form of transitional alumina is particularly desirable for an exhaust gas application. An example of the ball form of transitional alumina is that sold by the Kaiser Aluminum Company as "Activated Alumina KA–101." This material is prepared by the controlled calcination of beta trihydrate, and its finished form is composed mainly of eta alumina and alpha monohydrate. The final product has low silica and titanium dioxide content, 0.02 and 0.002 respectively. Its high surface area and resistance to abrasion make it admirably suited for an exhaust gas application. The material has a hard uniform surface, crushing strength of 66 percent, and excellent thermal stability properties. The sphericity of the active alumina balls eliminates or reduces to a minimum the chipping which is sometimes evident when using a granular material. Moreover, the uniform sphericity reduces packing and channeling, resulting in lower pressure drop as compared to a granular catalyst bed. Although aluminas of from about 1/16 to 3/8 inch diameter are suitable for this application, we prefer to use those ranging in size from 1/8 to 1/4 inch. Thus another preferred embodiment of this invention is a laminated catalyst especially suited for exhaust gas conversion, said catalyst consisting of ball form transitional alumina or from 1/16 to 3/8 inch, preferably from 1/8 to 1/4 inch in diameter, said alumina having a surface area of at least 75 m.$^2$/g. and containing from 0.01 to 5 percent silica, and having an initial laminal deposited thereon of oxides of manganese or iron or of one or more of the rare earth oxides, or a mixture of these oxides followed by an outermost lamina of copper oxide.

This invention also embodies the method of oxidizing substantially all of the carbon monoxide and unburned hydrocarbons found in the exhaust gas stream of internal combustion engines. According to this method, the exhaust gas products resulting from combustion of the gasoline fuel, together with an excess of air or oxygen, are conper (II) carbonate [$Cu(NH_3)_4CO_3$]. The precoated F-1 alumina is then immersed in this solution for a sufficient time to allow thorough impregnation. The time required for this step is usually less than one-half hour. The solution is heated to dryness, and the mass is spread on a surface. Heat is then gradually applied to the mixture and the copper complex decomposes to the oxide form. During the heating process, gaseous carbon dioxide, ammonia and water are evolved. The conversion is essentially complete at temperatures below 300° C. in less than about two hours. In this example the finished laminated catalyst contained 4 percent and 15 percent by weight of manganese and copper respectively in oxide forms. This concentration is determined by the relative amounts of alumina, manganese nitrate, and basic copper carbonate (in this case malachite) used in the preparation.

*Example II*

The procedure of Example I is followed but the amount of manganese nitrate and basic copper carbonate used is such that the finished catalyst contains 0.5 and 25 percent by weight of manganese and copper respectively in oxide forms.

*Example III*

F-1 alumina, coated with oxides of manganese as in Example I, is immersed in a solution of ferric nitrate so as to be thoroughly impregnated. The excess liquid is drained off and heat applied to drive-off the remaining free water. The mixture is then spread on a surface and in the presence of a draft of air is heated to above the decomposition temperature of ferric nitrate. The alumina carrier is now coated with successive laminae of manganese and iron oxides. This product is then impregnated with the copper solution as in Example I. The finished catalyst is F-1 alumina having successive laminae of manganese oxides, iron oxides, and an outermost lamina of copper oxides. The catalyst is predominantly F-1 alumina and contains 5 percent manganese, 5 percent iron and 8 percent copper by weight, all metals being in oxide forms.

*Example IV*

F-1 alumina is immersed in a common solution of manganese nitrate and ferric nitrate so as to be thoroughly impregnated. After decanting, the mass is heated so as to drive-off the remaining free water. The material is than spread on a surface which in the presence of a draft of air or inert gas is heated to above the decomposition temperature of manganese and iron nitrates. The carrier material, coated with one lamina comprising a mixture of oxides of iron and managanese, is now ready for the copper impregnation step. The product is immersed in the copper solution of Example I and heated. The material is then spread on a surface which is heated in the presence of a draft of air so as to decompose the copper complex to the oxide form. The finished catalyst contains 2 percent manganese, 2 percent iron, and 0.5 percent copper, all in oxide forms.

*Example V*

F-1 grade alumina pellets are mixed with crystalline manganese acetate tetrahydrate. The mixture is stirred and heated, the manganese acetate tetrahydrate melting in its own water of hydration. Heat is applied up to a point wherein all the free water has been evaporated. At this point the alumina pellets are coated with manganese acetate and have a slightly moist texture. The mixture is then spread on a surface which is heated to above the decomposition temperature of manganese acetate. This heating is done in the presence of a draft of air. During the heating the manganese acetate decomposes to an oxide or mixture of oxides. The coated alumina is then impregnated with a copper solution and the procedure of Example I is followed. The finished catalyst of this example is F-1 alumina coated with an initial lamina of manganese oxide and an outermost lamina of copper oxides, contains 4 percent manganese and 8 percent copper, both metals in oxide forms.

*Example VI*

A transitional alumina compound of alpha alumina monohydrate, amorphous alumina, and small quantities of gamma and theta transitional alumina is mixed with a solution of manganese nitrate and ferric nitrate. The solution is heated so as to evaporate all the free water, spread on a surface and heated to above the decomposition temperature of manganese and iron nitrates. The mass is cooled, then immersed in a solution of copper acetate and allowed to stand. The temperature of the solution is then gradually raised to drive-off all the free water. The mixture is then spread on a surface and heated to above the decomposition temperature of copper acetate. A draft of air is passed over the material. During the heating, the copper acetate decomposes to an oxide or mixture of oxides of copper. In this example the finished catalyst contains 5 percent manganese, 7 percent iron, and 10 percent copper in oxide forms.

*Example VII*

F-3 alumina is used as the carrier in this example. This granular transitional alumina has essentially the same elemental analysis as the alumina of Example I. Its loss on ignition is about 7.2 percent by weight and its surface area is about 200 m.$^2$/g. It is made by the controlled calcination of alpha alumina trihydrate and contains a mixture of transitional aluminas. This material is immersed in a solution of chromium nitrate, and the solution is heated and decomposed in the usual manner. The coated F-3 alumina is then mixed with a solution of basic copper carbonate, ammonia, and ammonium carbonate. The mass is then heated to drive-off the free water, spread on a surface and heated to above the decomposition temperature of copper carbonate. The finished catalyst is F-3 alumina having an initial lamina of chromium oxide and an outermost lamina of copper oxide. Based on the metallic weight, the chromium and copper oxides comprise about 3 and 15 percent by weight, respectively, of the total catalyst weight.

*Example VIII*

F-3 alumina is immersed in a solution manganese nitrate and iron nitrate. The mixture is decanted and heated in the usual manner whereby, through decomposition, the metal oxides are formed. The coated alumina is then immersed in a solution of the azurite form of basic copper carbonate [$2CuCO_3 \cdot Cu(OH)_2$], ammonium hydroxide, and ammonium carbonate. The excess liquid is then drained away. Heat is then gradually applied to the mixture and the copper complex decomposes to the oxide form. The conversion is essentially complete after heating for about 2 hours at a temperature of about 300° C. The finished catalyst consists of F-3 alumina laminated successively with a mixture of manganese and iron oxides, and with copper oxides. It contains about 3 percent by weight of manganese, 8 percent iron, and 15 percent copper, all in oxide forms.

*Example IX*

KA-101 alumina is used as the carrier in this example. This transitional alumina has about 95.4 percent $Al_2O_3$, about 0.02 percent $SiO_2$, about 0.02 percent $F_2O_3$, about 0.002 percent $TiO_2$, and 0.40 percent $Na_2O$. On ignition it loses about 4.2 percent of its weight. It is a ball form of transitional alumina having a surface area of about 360 m.$^2$/g. Its bulk density is about 43 lb./cu. ft. and it has a dynamic sorption of about 19.7 percent. This material has a crushing strength of about 66 percent. It is prepared by the carefully controlled calcination of beta trihydrate and its principal constituents are eta alumina and alpha monohydrate. Three-sixteenth inch diameter balls are immersed in a solution of nickel nitrate. The solution is heated to dryness, spread on a surface, and heated whereby, through decomposition, nickel oxide is formed. The dried mass is then immersed in a solution of cobalt nitrate and the above steps repeated. Cuprous oxide, $Cu_2O$, is then dissolved in a solution of ammonium carbonate and ammonium hydroxide. The highly soluble diamine cuprous carbonate $[Cu(NH_3)_2]_2CO_3$, is formed. The KA–101 alumina, coated with successive layers of oxides of cobalt and nickel, is then immersed in the copper solution and allowed to stand. The excess water is drained and the mass is then heated for about 3 hours at about 300° C. The finished laminated catalyst contains about one percent cobalt, 4 percent nickel, and 8 percent copper, all metals in oxide forms.

*Example X*

KA–101 alumina is immersed in a collodial suspension of titanium acetate so as to be thoroughly impregnated. The solution is heated to dryness, and the mass is spread on a surface and heated in a draft of air. The coated material is then immersed in a solution prepared from cupric oxide, ammonium hydroxide, and ammonium carbonate. The solution is decanted and the mass is heated for about 2 hours at temperatures of about 300° C. The finished laminated catalyst contains about 4 percent titanium and about 2 percent copper in oxide forms.

*Example XI*

F–10 alumina is used as the carrier material in this example. This activated transitional alumina is sold commercially by the Aluminum Company of America and contains about 92 percent $Al_2O_3$, 0.09 percent $Na_2O$, 0.09 percent $F_2O_3$, 0.09 percent $SiO_2$, and about 0.58 percent Cl. On ignition it loses about 3 percent of its weight. It is a granular form of alumina having a surface area of about 100 m.$^2$/g., a bulk density (packed) of about 55 lb./cu. ft., and a pore diameter of 80 A. This material is essentially 100 percent of the chi form of transitional alumina. The F–10 alumina is immersed in a solution of manganese and iron nitrates. After thorough impregnation the solution is heated to dryness, and the mass is heated and decomposed in the usual manner. The coated F–10 alumina is then immersed in a solution of copper acetate and ammonium hydroxide. After thorough impregnation, the excess liquid is drained and the mass is heated at 300° C. for about 2 hours. The finished laminated catalyst contains about 3 percent manganese, 5 percent iron, and 7 percent copper, all metals being in oxide forms.

*Example XII*

A mixture of eta and chi form of transitional alumina containing 5 percent silica is immersed in a solution of manganese nitrate. After a thorough impregnation, the solution is heated to dryness. The mass is then spread on a surface and heated in the presence of a draft of air. The coated F–10 alumina is then immersed in a solution of ammonium carbonate, ammonium hydroxide, and basic copper carbonate. The solution is heated to dryness, spread on a surface and heated to decompose the copper carbonate. The finished catalyst is F–10 alumina having successive laminae of oxides of manganese and copper. The catalyst is predominantly F–10 alumina and contains about 4 percent manganese and 12 percent copper, both metals in oxide forms.

*Example XIII*

F–10 alumina is immersed in a solution of scandium nitrate. In the usual manner the solution is heated to dryness and then decomposed. The product is then immersed in a solution of copper acetate. The solution is heated to dryness and the resulting product spread on a surface and heated at about 300° C. for 2 hours. The finished laminated catalyst contains about 6 percent scandium and 12 percent copper in oxide forms.

*Example XIV*

A solution of a mixture of rare earth nitrates is prepared. The rare earth mixture is derived from the naturally occurring monazite ore. In an oxide form the approximate composition of the mixture is as follows:

| | Percent |
|---|---|
| Lanthanum oxide ($La_2O_3$) | 24 |
| Cerium oxide ($CeO_2$) | 48 |
| Praseodymium oxide ($Pr_6O_{11}$) | 5 |
| Neodymium oxide ($Nd_2O_3$) | 17 |
| Samarium oxide ($Sm_2O_3$) | 3 |
| Gadolinium oxide ($Gd_2O_3$) | 2 |
| Yttrium oxide ($Y_2O_3$) | 0.2 |
| Other rare earth oxides | 0.8 |

The mixture, converted to nitrate salts, is commercially available from Lindsay Chemical Division of American Potash and Chemical Corporation. KA–101 alumina passing through a 6 mesh sieve (Tyler Standard Screen Scale Sieve) and retained by an 8 mesh is dried at a temperature of 400° C. for about one hour. The dried KA–101 is then immersed in a solution of rare earth nitrates so as to be thoroughly impregnated. The excess solution is drained away and the impregnated alumina heated to about 600° C. for about one-half hour. At this stage the KA–101 alumina is impregnated with the rare earth oxide mixture.

A solution is prepared of basic copper carbonate $CuCO_3 \cdot Cu(OH)_2$, ammonium carbonate, and ammonia. The transitional alumina impregnated with the rare earth mixture from step one above is immersed in the copper solution. After thorough impregnation, the excess liquid is drained away and the remaining material heated to 440° C. for about one hour. During this heating period the copper compound decomposes to an oxide form. The finished laminated catalyst contains 3.9 percent of a mixture of rare earths and about 14 percent copper.

*Example XV*

The procedure of Example XIV is followed but the amounts of starting materials are such that the finished laminated catalyst contains 12 percent of a mixture of rare earths and 9 percent copper.

*Example XVI*

A solution of lanthanum nitrate, cerium nitrate, and neodymium nitrate is prepared. Five to 8 mesh KA–101 alumina is immersed in the solution and allowed to soak. The excess liquid is drained away and the impregnated alumina spheres are heated to 650° C. for one hour. This material is then impregnated with a solution of a mixture of malachite and azurite forms of basic copper carbonate, ammonium carbonate, and ammonia. After decanting, the material is heated to about 650° C. for one hour. The finished laminated catalyst contains 5 percent cerium, 6 percent lanthanum, 5 percent neodymium and 12 percent copper, all in oxide forms.

*Example XVII*

Five to 8 mesh KA–101 alumina previously dried for one hour at 450° C. is soaked in a solution of ferric nitrate. The unabsorbed solution is decanted and the remaining mixture is heated to 600° C. for about one hour. At this stage the KA–101 alumina is coated with oxides of iron. This material is then immersed in a solution of basic copper carbonate, ammonium carbonate, and ammonia and allowed to stand so as to be thoroughly impregnated. The unabsorbed solution is drained away and the moist catalyst material is heated to about 440° C. for one hour. The finished laminated catalyst, KA–101 alumina coated with successive layers of iron and copper oxides contains about 5.3 percent iron and 7.6 percent copper.

Example XVIII

The procedure of Example XVII is followed but the quantities of starting materials are such that the finished catalyst, KA-101 alumina coated with successive layers of iron oxides and copper oxides, contains about 6 percent iron and 12 percent copper.

Example XIX

Predried 6 to 8 mesh KA-101 alumina is immersed in a solution of cerium nitrate. After soaking and decanting, the catalyst material is heated to about 600° for one-half hour. This material is then immersed in a solution of basic copper carbonate, ammonium carbonate and ammonia. After soaking the excess solution is drained away and the material is heated to 460° for about one hour. The finished catalyst, having successive layers of cerium oxide and copper oxide, contains about 4 percent cerium and 8 percent copper.

Example XX

Five to 8 mesh KA-101 alumina is immersed in an equimolar solution of lanthanum nitrate and yttrium nitrate. After thorough impregnation and decanting the material is heated to about 575° C. for one hour. The material is then immersed in a solution of basic copper carbonate, ammonium carbonate, and ammonia, allowed to stand and the excess liquid drained away. The material is then heated to 465° C. for one hour. The finished catalyst is KA-101 alumina coated with successive layers of a mixture of lanthanum and yttrium oxides, and copper oxides. The finished catalyst contains 3 percent yttrium, 4.7 percent lanthanum, and 10 percent copper.

Example XXI

Five to 8 mesh KA-101 alumina is impregnated with a solution of cobalt carbonate. After heating to about 600° C. for one hour the material is impregnated with a solution of ammonium metavanadate and oxalic acid and heated to about 575° C. for one hour. The resulting material is then impregnated with a solution of basic copper carbonate, ammonium carbonate, and ammonia. This material is heated to 475° for one hour. The finished catalyst is KA-101 alumina impregnated with successive layers of cobalt oxides, vanadium oxides, and copper oxides. The catalyst contains 4.4 percent cobalt, 1.2 percent vanadium, and 8.6 percent copper.

Example XXII

Six to 8 mesh KA-101 alumina is immersed in a solution of cobalt carbonate. The impregnated alumina is then heated to 600° C. for one hour and further impregnated with a solution of basic copper carbonate, ammonium carbonate, and ammonia. The resulting material is heated at 450° C for one hour. The finished catalyst is KA-101 alumina coated with successive layers of oxides of cobalt and copper. The catalyst contains 1.4 percent cobalt and 3.7 percent copper.

The catalysts of this invention have been evaluated with regard to both physical durability and oxidation efficiency. We have found that many prior catalysts, although being initially rugged and extremely resistant to physical attrition, with use, are softened and may lose physical durability. Therefore, prior to an evaluation of their physical durabilities, the catalysts were used in an actual exhaust gas application. The exhaust gas of a CFR L-Head, 7:1 compression ratio, single cylinder engine was contacted with a catalyst bed composed of 42 cubic centimeters of each catalyst for a period of approximately 80 hours. Throughout the test, a secondary air supply to provide oxygen for the oxidation was introduced into the exhaust gas stream just prior to the catalyst bed. During the test, the engine was continually cycled, 50 seconds under idling conditions and 150 seconds at wide-open throttle. The operation conditions for the test are as follows:

TABLE I

|  | Idle | Wide-open throttle |
|---|---|---|
| Engine speed, r.p.m. | 750 | 1,140 |
| Volume of exhaust gas, s.c.f.h. | 90 | 250 |
| Volume of secondary air, s.c.f.h. | 40 | 40 |
| Hydrocarbon (vol. percent) | 0.04 | 0.03 |
| $CO_2$ | 4 | 10 |
| $CO$ | 7 | 3 |
| $O_2$ | 9 | 4.5 |
| Space velocity (v./v./hr.) | 5,350 | 11,900 |

Our experience has shown that many catalysts are effective for the oxidation of deleterious exhaust gas constituents when the engine is operated on a fuel free from or relatively low in sulfur and organolead antiknock compounds. However, the oxidation products of organolead compounds and sulfur commonly found in gasolines are poisonous to most catalysts. So as to make the test a severe one, the engine was operated on a fuel containing 12 grams of lead per gallon as tetraethyllead and 0.12 percent by weight sulfur. The fuel contained commercial amounts of scavenging agents; viz., 1.0 theory of ethylene dichloride and 0.5 theory of ethylene dibromide, based on the amount of lead present. One theory is the theoretical amount required to completely react with all the lead present. With respect to sulfur and lead compounds, the conditions of this test are much more severe than a catalyst would be subjected to in a commercial application, wherein fuels contain from about 2 to 4 grams of lead per gallon as tetraethyllead and contain from about 0.03 to 0.07 weight percent sulfur.

The composition of the fuel on which the engine was operated during this test is as follows:

TABLE II—FUEL COMPOSITION

|  | ° F. |
|---|---|
| Initial boiling point | 97 |
| 10 percent evaporated | 148 |
| 50 percent evaporated | 236 |
| 90 percent evaporated | 327 |
| Final boiling point | 422 |
| Hydrocarbon type, volume percent: | |
| Aromatics | 40 |
| Olefins | 4 |
| Saturates | 56 |
| Sulfur, weight percent | 0.12 |
| TEL content, g./gal. as tetraethyllead | 12.0 |
| Ethylene dichloride, theories | 1.0 |
| Ethylene dibromide, theories | 0.5 |

The exhaust gas of the engine operated on the above described fuel was passed through the catalyst bed. With but a few exceptions, the testing period was approximately 80 hours. The hydrocarbon and carbon monoxide concentration of the exhaust gas stream was measured prior to and after passage through the catalyst bed. After the 80 hour test period, approximately 200 cc. of the catalyst material was screened so as to eliminate all material passing through a U.S. Standard Sieve Series No. 8 (.0937 inch) Sieve. The retained material was weighed and then placed in a one quart can which was then subjected to a severe shaking period for 30 minutes. A commercial shaker used in the paint industry was used for this purpose. After the shaking period, the catalyst was screened so as to eliminate all the material passing through a No. 14 (.0555 inch) Sieve. The retained material was again weighed. The weight of the material lost due to the violent shaking divided by the amount of starting material is reported as percent loss. The percent of the material lost is correlated with catalyst hardness and physical durability after being in actual use. A small percent loss indicates a catalyst with excellent properties with respect to physical ruggedness and durability, whereas a large loss indicates a catalyst susceptible to softening, pulverization and general attrition.

The results of both the oxidation efficiency and physical durability tests are reported in Table III. Catalysts 6 and 10 were exposed to the exhaust gas for 40 hours, and catalyst 16 was exposed for 60 hours. All other catalysts were exposed for an approximate 80 hour period.

and KA-101 aluminas are used as the supporting materials. In each case, the physical durability of the copper catalyst is improved by depositing an initial lamina composed of oxides of manganese or iron or of a mixture of manganese and iron prior to the copper oxide lamina. The initial activities of the coated catalysts are approximately equal to or larger than those of the uncoated

TABLE III—OXIDATION EFFICIENCY AND PHYSICAL DURABILITY OF SUPPORTED CATALYSTS

| Catalyst Number | Catalyst Composition | Initial Activity Oxidation of— | | Decay Rate, Efficiency Decrease Per Hour | | Physical Durability Loss after 30 Min. of Shaking |
|---|---|---|---|---|---|---|
| | | Hydrocarbon | CO | Hydrocarbon | CO | |
| | F-3 Alumina with successive laminae of oxides of: | | | | | |
| 1 | Cu | 60 | 97 | 0.23 | 0.32 | 13.3 |
| 2 | (Mn) and Cu | 77 | 100 | 0.63 | 0.51 | 8.0 |
| 3 | (Mn-Fe) and Cu | 71 | 93 | 0.68 | 0.46 | 5.4 |
| 4 | (Fe) and Cu | 67 | 97 | 0.56 | 0.69 | 4.5 |
| 5 | *Mn-Fe-Cu | 77 | 97 | 0.62 | 0.45 | 31.5 |
| 6 | *Mn-Fe | 70 | 94 | 1.50 | 1.91 | 4.8 |
| | F-1 Alumina with successive laminae of oxides of: | | | | | |
| 7 | Cu | 65 | 97 | 0.47 | 0.51 | 14.9 |
| 8 | (Mn) and Cu | 66 | 97 | 0.80 | 0.77 | 4.6 |
| 9 | (Mn-Fe) and Cu | 63 | 97 | 0.56 | 0.76 | 6.2 |
| 10 | *Mn-Fe | 77 | 96 | 1.50 | 1.75 | 6.6 |
| | F-10 Alumina with successive laminae of oxides of: | | | | | |
| 11 | Cu | 71 | 94 | 0.53 | 0.42 | 15.9 |
| 12 | (Mn-Fe) and Cu | 74 | 94 | 0.97 | 0.62 | 12.6 |
| 13 | (Fe) and Cu | 75 | 97 | 0.67 | 0.75 | 4.7 |
| | KA-101 Alumina with successive laminae of oxides of: | | | | | |
| 14 | Cu | 54 | 87 | 0.64 | 0.62 | 17.4 |
| 15 | (Mn-Fe) and Cu | 73 | 98 | 0.88 | 1.00 | 8.9 |
| 16 | *Mn-Cu | 77 | 97 | 1.10 | 1.20 | 17.1 |
| 17 | (Rare earth mixture)[1] and Cu | 70 | 97 | 0.70 | 0.71 | 3.0 |
| | H-151[2] Alumina with successive laminae of oxides of: | | | | | |
| 18 | (Mn-Fe) and Cu | 72 | 93 | 1.38 | 1.53 | 4.4 |

( ) Initial lamina comprises one layer of oxides of the indicated metal(s).
*Non-laminated catalyst prepared by deposition of the metal salts simultaneously from a common solution.
[1] Rare earth mixture as shown in Example XIV.
[2] Transitional alumina, but contains more than 5 percent silica.

In selecting a catalyst for a commercial exhaust gas application, primary consideration must be given to (1) initial catalyst activity, (2) the rate of efficiency decay and, (3) catalyst physical durability. Catalysts, in addition to having the first two requisites, must also be resistant to softening and attrition for long periods of time. Conversely, though a catalyst may be extremely rugged, it must have an acceptable combination of initial activity and decay rate so as to make it useful for long periods. It is extremely difficult to find a catalyst system with superior qualities in all respects and by necessity the final choice is dictated by a consideration and balancing of the three enumerated properties.

As shown in Table III, catalyst 1, composed of copper impregnated on F-3 alumina, has excellent oxidation properties. It has an extremely low decay rate, 0.23 and 0.32 percent per hour with respect to hydrocarbon and carbon monoxide oxidation respectively. Used in this context, decay rate is defined as the approximate slope of the percent oxidation versus time curve. However, the physical durability of this catalyst, as indicated by the shaking test, is somewhat wanting, the catalyst losing 13.3 percent of its weight after 30 minutes of shaking.

The physical durability of the copper catalysts is markedly improved when the F-3 alumina is precoated with an initial lamina of oxides of manganese or with a mixture of manganese and iron oxides (catalysts 2–4), the weight loss of the coated catalyst being reduced by as much as 60 percent. The initial activity of these laminated catalysts is about equal to or greater than that of the uncoated copper catalyst. Although the efficiency decay rate is slightly larger for the coated catalysts, longevity is still considered adequate for a commercial application. The improved physical durability of the coated catalysts more than offsets the decrease in oxidation efficiency. Similar results are obtained when F-1, F-10, catalysts. In each case, the decay rate of the coated catalysts increased, but in most cases, catalyst efficiency was adequate for a commercial application. In considering initial activity, decay rate, and physical durability, the copper catalysts precoated with oxides of manganese or iron or manganese and iron are superior to uncoated copper catalysts.

Specific attention is directed to catalysts 3 and 5. Both catalysts are identical in composition but were prepared in different manners. Number 3 has an initial lamina composed of a mixture of manganese and iron oxides followed by an outer copper oxide layer, whereas catalyst 5, a non-laminated catalyst, has manganese, iron, and copper oxides deposited on the carrier simultaneously from a common solution of the three metals. The two catalysts are quite similar with respect to initial activity and decay rate, but the laminated catalyst is far superior with respect to physical durability. Whereas the laminated catalyst lost only 5.4 percent of its weight after the shaking test, the unlaminated catalyst lost 31.5 percent. Such results serve to further emphasize the importance of having a lamina between the alumina carrier and the outer copper oxide layer.

Numbers 6 and 10, non-copper catalysts, were prepared by the simultaneous deposition on the alumina carrier of a mixture of manganese and iron oxides. It will be noted that the initial activity and durability properties of these catalysts are quite acceptable, but the extremely high decay rates would preclude the use of such catalysts for an exhaust gas application. However, this product makes an excellent support material for copper oxide. Thus, the desirable properties of good durability, high initial activity, and a low decay rate are combined in a finished laminated catalyst.

Catalyst 16 was prepared by the simultaneous deposition of manganese and copper on the alumina carrier.

This catalyst has good initial activity, but a marginal decay rate and poor durability properties. The latter two properties are improved by depositing a lamina of a mixture of manganese and iron prior to the copper oxide lamina (catalyst 15).

Precoating KA-101 alumina with a mixture of rare earth oxides followed by a layer of copper oxide (prepared as in Example XIV) results in a catalyst having superior resistance to physical attrition. As shown by the data of Table III, this is the most durable of the catalysts tested. Moreover, this catalyst showed excellent oxidation activity toward hydrocarbons and carbon monoxide and an acceptable efficiency decay rate.

Catalyst 18 has a lamina of a mixture of oxides of manganese and iron followed by a lamina of copper oxide. In this respect this catalyst is within the scope contemplated by this invention. The alumina carrier used in this preparation, Alcoa H-151, is a transitional alumina predominantly of the gamma type. However, this material contains more than 5 percent silica, and hence, cannot be used in the preparation of our catalysts. The initial activity and the physical durability of this catalyst was quite acceptable; however, decay rates of 1.38 and 1.53 for hydrocarbon and carbon monoxide oxidation, respectively, are unacceptable. This example serves to illustrate that only select transitional aluminas can be used to prepare our catalysts.

The foregoing tests clearly point out that superior catalysts can be prepared only with the requisite transitional aluminas having more than 75 m.$^2$/g., and containing from 0.01 to about 5 percent silica, and there must be at least one lamina between the alumina carrier and the outer lamina of copper oxide. Catalysts prepared outside these limits will be defective in either initial activity, decay rate, or physical durability.

Our catalysts have been tested under actual operating conditions in modern automobiles with excellent results. As an example, one catalyst composed of KA-101 alumina coated with successive layers of iron oxides and copper oxides (5.3 percent iron and 7.6 percent copper) was used to catalyze the oxidation of hydrocarbons and carbon monoxide emitted from a 1959 Ford. The vehicle, a normal V-8 standard product model, was driven in conventional city-urban traffic. The vehicle was operated on a commercial type gasoline which contained 3 milliliters of tetraethyllead per gallon, commercial quantities of ethylene dibromide and ethylene dichloride, 0.3 theories of phosphorus as a commercial phosphorus additive, and about 0.07 percent sulfur. Twenty-five pounds of the catalyst material was packed in a specially designed container. The container replaced the conventional muffler. By means of a variable speed blower additional secondary air was introduced into the exhaust gas system prior to the catalyst bed. The ability of the catalyst to promote the oxidation of the unburned hydrocarbons and carbon monoxide in the exhaust gas stream was determined periodically. Oxidation efficiencies measured, while the vehicle was operated at a steady rate 60 miles per hour are as follows:

TABLE IV—OXIDATION EFFICIENCIES OF LAMINATED CATALYST

| Accumulated Mileage | Percent oxidation of— | |
|---|---|---|
| | Hydrocarbons | Carbon monoxide |
| 0 | 75.9 | 98.2 |
| 2,521 | 60.3 | 85.7 |
| 4,601 | 64.8 | 90.2 |
| 6,892 | 44.2 | 84.9 |
| 9,108 | 52.2 | 85.7 |
| 11,311 | 55.0 | 76.0 |

As shown by the above data, after being in actual operation for over 11,000 miles the catalyst efficiency was still very high. This mileage represents over one years' driving for the average motorist. At the indicated rate of activity decay, this laminated catalyst can be retained in operation for many additional miles prior to being replaced with fresh catalysts.

A very important feature of our catalysts lies in their enhanced properties with respect to general physical durability. The inherent oxidation properties of these precoated catalysts are such as to make their use feasible in a commercial application. These catalysts have the ability to initially oxidize well over 60 percent of the unburned hydrocarbons and over 90 percent of the carbon monoxide content of the exhaust gas stream. The decay rate and physical durability are such that these catalysts may be used for extremely long periods of time without regeneration or replacement.

Another important feature of the catalysts of this invention is their excellent thermal stability. The catalyst bed temperature under normal engine operation may vary from 400 to 1700° F. Under extreme conditions of severe acceleration and deceleration, bed temperatures as high as at least 1750° F. have been observed. Using catalysts of this invention, catalyst peds have been operated at temperatures at least this high without substantially affecting catalytic activity. The property of heat stability is very important because it obviates the necessity of installing a mechanical system to have the exhaust gas by-pass the catalyst bed in case of extremely high temperatures. Such a by-pass system would be required if the catalyst were susceptible to damage at high temperatures. Good thermal stability is also desirable in that it allows the reaction to be carried out at higher temperatures wherein higher efficiencies may be attained. Furthermore, this property becomes important when considering the design of a commercial vehicle exhaust system incorporating an oxidation catalyst. The additional heat from the oxidation process would naturally tend to overheat the passenger compartment. This problem could be solved by insulating the catalyst bed and exhaust system. Of course this would be possible only if the catalyst could tolerate the higher temperatures due to the insulation.

Still another important feature of the catalysts of this invention is their ability to catalyze reactions at extremely low temperatures. Since catalyst activity generally increases with temperature, in many applications it can be optimized by the simple expediency of increasing reaction temperatures. However, in exhaust gas conversion, temperatures cannot readily be controlled and a rather anomalous requisite of high activity at both low and high temperatures is imposed. The catalysts of this invention are active at a temperature as low as 450° F. i.e., temperatures below that of the exhaust gas stream. Of course, as the oxidation starts, the heat of reaction serves to raise bed temperatures to a much higher level.

Another feature of the catalysts of this invention is their ability to catalyze the oxidation of hydrocarbons and carbon monoxide without the concomitant oxidation of nitrogen. This is an important consideration. Oxides of nitrogen, and their subsequent reaction products readily contribute to the formation of photochemical smog and are eye and respiratory irritants.

To aid the oxidation, secondary air may or may not be introduced into the system. To obtain maximum efficiency, we have found it preferable to introduce secondary air into the system. This is accomplished by the use of a variable speed blower, so that the amount of secondary air varies with operating conditions. The secondary air supply may also be introduced as a natural flow through the use of an appropriate air scoop or the like.

Our catalysts can be used to convert the exhaust gas of any gasoline. The gasolines can be of the aliphatic, aromatic and olefinic type including both straight run and catalytically produced gasolines and any and all mixtures thereof. The gasolines can contain the usual additives including organolead and other antiknock agents, such as tetraethyllead, tetraphenyllead, tetramethyllead, mixtures of alkylleads, such as tetraethyllead-tetramethyllead mixtures, ferrocene, methylcyclopentadienyl manganese tricarbonyl, cyclopentadienyl nickel nitrosyl, scavengers, antioxidants, such as aromatic amines and diamines, 2,6-dialkyl- and 2,4,6-trialkyl phenols, dies, deposit modifiers, including trimethyl phosphate, dimethylphenyl phosphate, and the like.

In addition to use in spark ignition internal combustion engines, the present catalyst may also be used to reduce or eliminate unburned hydrocarbons and carbon monoxide from the exhaust products of combustion processes in general. This includes the compression ignition engine, oil and coal furnaces, residual fuel burners, etc.

We claim:

1. A laminated catalyst composition consisting essentially of a major portion of transitional alumina having an initial lamina deposited thereon of from about 0.5 to 20 from the group consisting of the First Transition Series of the Periodic Table and the Lanthanide Series of Elements, and as the outermost lamina from about 0.5 to 25 percent by weight of copper in an oxide form.

2. The composition of claim 1 wherein said transitional alumina is the product derived from the controlled calcination of alpha-alumina trihydrate and contains at least 30 percent chi form of transitional alumina, at least 30 percent of alpha-monohydrate transitional alumina, and at least 10 percent amorphous alumina said transitional alumina being characterized by containing from 0.01 to about 5 percent silica and by having a surface area of at least 75 square meters per gram.

3. The composition of claim 1 wherein said transitional alumina is a product derived from the controlled calcination of beta-trihydrate alumina and contains eta and alpha-monohydrate transitional forms of alumina said transitional alumina being characterized by containing from 0.01 to about 5 percent silica and by having a surface area of at least 75 square meters per gram.

4. A laminated catalyst composition consisting essentially of a major portion of a transitional alumina having an initial lamina of from about 0.5 to 20 weight percent of an iron oxide deposited thereon and an outer lamina of from about 0.5 to 25 weight percent of a copper oxide.

5. The composition of claim 4 wherein said transitional alumina is derived from the controlled calcination of β-trihydrate alumina and contains the eta and α-monohydrate transitional forms of alumina, and being further characterized by containing from 0.01 to about 5 weight percent silica and by having a surface area of at least 75 m.$^2$/g.

6. The composition of claim 4 wherein said transitional alumina is derived from the controlled calcination of α-alumina trihydrate and contains at least 30 weight percent chi, 30 percent α-monohydrate and 10 weight percent amorphous forms of alumina, said alumina being characterized by containing from 0.01 to about 5 weight percent silica and by having a surface area of at least 75 m.$^2$/g.

References Cited by the Examiner

UNITED STATES PATENTS

| | | | |
|---|---|---|---|
| 1,589,644 | 6/1926 | Hedenburg | 23—61 |
| 1,871,117 | 8/1932 | Day | 252—462 X |
| 2,071,119 | 2/1937 | Harger | 23—2 |
| 2,402,854 | 6/1946 | Thomas | 252—462 X |
| 2,688,603 | 9/1954 | Baldwin | 252—476 |
| 2,725,400 | 11/1955 | Mecorney et al. | 252—476 X |
| 2,742,437 | 4/1956 | Houdry | 252—477 X |
| 2,794,784 | 1/1957 | Buselli et al. | 252—476 |
| 2,867,497 | 1/1959 | Houdry et al. | 23—2 |
| 2,945,057 | 7/1960 | McDaniel et al. | 252—462 X |
| 3,009,871 | 11/1961 | Komarewsky | 252—462 X |
| 3,112,277 | 11/1963 | Michalko | 23—2.2 X |
| 3,133,029 | 5/1964 | Hoekstra | 252—466 |
| 3,140,148 | 7/1964 | Hofer et al. | 23—2.2 X |

FOREIGN PATENTS 950,235   2/1964   Great Britain.

MAURICE A. BRINDISI, *Primary Examiner.*

UNITED STATES PATENT OFFICE
CERTIFICATE OF CORRECTION

Patent No. 3,226,340                            December 28, 1965

Ruth E. Stephens et al.

It is hereby certified that error appears in the above numbered patent requiring correction and that the said Letters Patent should read as corrected below.

Column 3, line 50, for "of" read -- or --; column 5, lines 38 and 39, for "alumninas" read -- aluminas --; column 6, line 31, for "absorbent" read -- adsorbent --; line 62, for "or from" read -- of from --; line 65, for "laminal" read laminae --; column 14, before line 40, insert -- ASTM distillation: --; column 18, line 23, for "catalyst peds" read -- catalyst beds --; column 19, line 8, for "dies" read -- dyes --; line 20, after "to" insert -- 20 percent of at least one metal, in an oxide form, selected --.

Signed and sealed this 6th day of December 1966.

(SEAL)

Attest:

ERNEST W. SWIDER
Attesting Officer

EDWARD J. BRENNER
Commissioner of Patents